United States Patent [19]

Renshaw et al.

[11] Patent Number: 4,529,115

[45] Date of Patent: Jul. 16, 1985

[54] THERMALLY ASSISTED ULTRASONIC WELDING APPARATUS AND PROCESS

[75] Inventors: Theodore A. Renshaw, North Babylon; Joseph A. Curatolo, Jr., Jackson Heights; Albert Sarrantonio, Woodbury, all of N.Y.

[73] Assignee: Fairchild Industries, Inc., Chantilly, Va.

[21] Appl. No.: 484,187

[22] Filed: Apr. 12, 1983

[51] Int. Cl.³ .............................................. B23K 20/10
[52] U.S. Cl. .................................... 228/1.1; 156/580.1
[58] Field of Search ............... 228/1 R, 110, 111, 232; 219/128; 156/580.1

[56] References Cited

U.S. PATENT DOCUMENTS 2,985,954  5/1961  Jones et al. ..................... 228/1 R X
3,438,428  4/1969  Balamuth et al. ............... 228/1 R X
3,908,886  9/1975  Raske ................................. 228/1 R
3,924,791 12/1975  Shimizu ........................... 228/1 R X
4,426,244  1/1984  Wang ................................. 228/1 R X
4,490,199 12/1984  Dunning ......................... 156/580.1 X Primary Examiner—Kenneth J. Ramsey
Attorney, Agent, or Firm—Michael W. York

[57] ABSTRACT

Method and apparatus are provided for use in an ultrasonic vibratory welder for pre-heating the workpieces prior to welding and, thereafter, for continuously monitoring the temperature of the anvil and of the welding tip during subsequent welding operations to insure their temperature remains within a pre-determined range during the entire welding cycle. It has been found that weld characteristics, particularly weld size, shape, configuration and strength are dependent upon the temperature of the anvil and welding tip. Thermostatically controlled resistance heating means are provided in the anvil and/or in the welding tip for pre-heating of the workpieces. Automatic control means, are also provided for alternately heating and cooling the anvil and welding tip during the welding cycle.

3 Claims, 6 Drawing Figures

THERMALLY ASSISTED ULTRASONIC WELDING APPARATUS AND PROCESS

BACKGROUND OF THE INVENTION

The present invention relates generally to ultrasonic vibratory welding apparatus and process and, more particularly, to such apparatus and process wherein prior to welding the workpieces to be welded together and the welding tip and anvil are pre-heated and, further, wherein the temperature of the welding tip and/or the anvil are monitored and controlled during the welding operation to insure that subsequent welds are generally uniform in size, shape and strength. Pre-heating of the tip, anvil and workpieces has been found to result in substantially stronger welds.

Ultrasonic vibratory spot welding processes for joining together two or more similar or dissimilar materials have been used for a number of years. Until recently, however, such methods were limited to use on thermoplastics, non-woven fabrics and metals where weld strength and integrity were not particularly important. This limitation was due, in large measure, to the problems associated with the ultrasonic welding methods employed, most of which were in prototype stages. In those instances when weld strength and weld integrity were important, i.e., when joining together structural aircraft panels and the like, resistance spot welding procedures were used.

Ultrasonic spot welding procedures have recently demonstrated strong potential for improved sheet metal assembly at reduced cost when compared with resistance spot welding and adhesive bonding techniques. Early studies have indicated that welds effected using prototype ultrasonic welding equipment such as, for example, a Sonobond M-8000 ultrasonic spot welder, were superior to welds produced using conventional resistance spot welding procedures. These early trials indicated that for virtually any material combination, an ultrasonically produced spot weld has an ultimate yield strength of more than 2.5 times that of a weld produced using resistance spot welding equipment. Further tests indicated that ultrasonically produces spot welding can be accomplished with a 75% time and cost savings over conventional adhesive bonding techniques. Until now, however, ultrasonic spot welding for large structural metal parts was not possible in a production environment because of the numerous problems associated with the procedures.

Ultrasonic vibratory welding is a metallurgical joining technique which utilizes high frequency vibrations to disrupt the surface films and oxides and which, therefore, promotes interatomic diffusion and plastic flow between the surfaces in contact without any melting of the materials. Briefly stated, the ultrasonic welding process consists of clamping or otherwise securing together the workpieces under moderate pressure between the welding tip and a support anvil and then introducing high frequency vibratory energy into the pieces for a relatively short period of time, i.e., from a fraction of a second to a number of seconds. In many instances, the pieces to be welded may also be adhesively bonded together by the insertion of an adhesive bonding agent between the juxtaposed pieces before which result in a high strength, uniform bond between them.

One example of an ultrasonic spot welder particularly adapted for use on structural metal workpieces is the Sonobond Model M-8000 Ultrasonic Spot Welder marketed by the Sonobond Corporation of West Chester, Pa. This welder includes a transistorized, solid state frequency converter which raises standard 60 Hz electrical line frequency to 15-40 kHz and then amplifies the output. The high frequency electrical power travels through a lightweight cable to a transducer in the welding head where it is converted to vibratory power at the same frequency. The vibratory power is, thereupon, transmitted through an acoustic coupling system to the welding tip and then through the tip into and through the workpieces, with the vibratory energy effecting the weld.

The Sonobond M-8000 Ultrasonic Spot Welder includes a wedge-reed, transducer coupling system which transmits lateral vibrations of a perpendicular reed member attached to it so that the welding tip at the upper end of the reed executes shear vibrations on the surface of the workpieces. The transducer includes piezoelectric ceramic elements encased in a tension shell assembly and operates at a nominal frequency of 15 kHz. A solid state frequency converter with a transistorized hybrid junction amplifier powers the welder. The converter operates at a nominal frequency of 15 kHz with a power output variable up to about 4000 RMS RF watts. The welder may be turned to a precise operating frequency. The frequency converter includes a wide-band RF power measuring circuit which samples output power and detects forward power and load power based on the principle of bi-directional coupling in a transmission line. The signal is processed electronically to provide true RMS values which are selectively displayed on an LED panel meter as either the forward or load power. Forward power is the output of the frequency converter delivered to the transducer in the welding head while load power is the transducer drive power acoustically absorbed in the work zone. The difference between the two readings is the reflected power induced by the load impedance mismatch and is minimized during the welding operation by impedance matching techniques.

In early trials using prototype ultrasonic welding equipment to weld aluminum alloys, it was discovered that certain problems were encountered particularly with regard to "tip walking" and workpiece movement, i.e., the welding tip tended to move laterally or horizontally during the course of the welding cycle and the workpieces were sometimes extruded from the working zone. It was discovered that tip walking occurred because the workpieces located beneath the welding tip were in a mechanically unstable condition during the welding operation. As can readily be appreciated, tip walking and workpiece motion create a highly undesirable condition in that it is virtually impossible to precisely pinpoint the point of weld. Additionally, these conditions result in a lesser strength weld. In general, when collar clamps are applied tip walking might occur and when clamps are not used or are used too lightly then the workpiece will be spit out of the work zone and made to move.

During these trials, it was found that, during the course of the welding operation, the temperature of the welding tip and the anvil were particularly important since it was found that the quality and size of the welds effected were dependent upon such temperatures. During start-up when the welding tip and anvil were "cold", it was frequently impossible to effect a good weld. Oftentimes it would take six or seven "practice" welds before the equipment was hot enough to effect a good weld. Then, after about 30 or 40 welds, the welding tip and anvil became so hot that a cooling medium had to be passed over the parts to lower their temperature and insure good weld uniformity. It was found that when the welding tip and anvil "overheated", the resultant weld size would grow and thus cause non-uniformity in weld size, shape and strength.

Against the foregoing background of the invention, it is a primary object of the present invention to provide an ultrasonic welding method which is adaptable for use in the production welding of structural metallic parts.

It is another object of the present invention to provide such a method which results in high strength and durable welds.

It is yet another object of the present invention to provide such a method which produces uniform welds during the entire welding period.

It is yet still another object of the present invention to provide such a method which continuously monitors the temperature of the welding tip and support anvil during the welding cycles and controls their temperature to insure uniform weld size and strength over the entire welding period.

BRIEF SUMMARY OF THE INVENTION

The present invention, in brief summary, comprises method and apparatus for use in the ultrasonic welding of structural metal workpieces. The ultrasonic welder employed is of the type which includes a welding tip and an anvil, between which the workpieces are adapted to be inserted and welded using high frequency vibrations emitted from the welding tip to effect the weld. The welding tip and/or the anvil are adapted to alternately move up and down to first clamp the workpieces therebetween in preparation for welding. Means, preferably resistance heater means on the anvil, are provided for pre-heating the workpieces prior to welding as it has been demonstrated that such pre-heating results in substantially stronger welds. Control means are further provided for monitoring the temperature of the anvil and of the welding tip during a particular welding cycle to insure that the temperature of said elements remains within a pre-determined range above said pre-determined temperature and below a second, higher pre-determined temperature. When the temperature of the elements exceed the second, higher pre-determined temperature, the control means are adapted to actuate cooling means for cooling the anvil and/or welding tip. Preferred cooling means includes a stream of compressed air adapted to be blown over the anvil and/or welding tip.

DETAILED DESCRIPTION OF THE INVENTION

Figure 1:
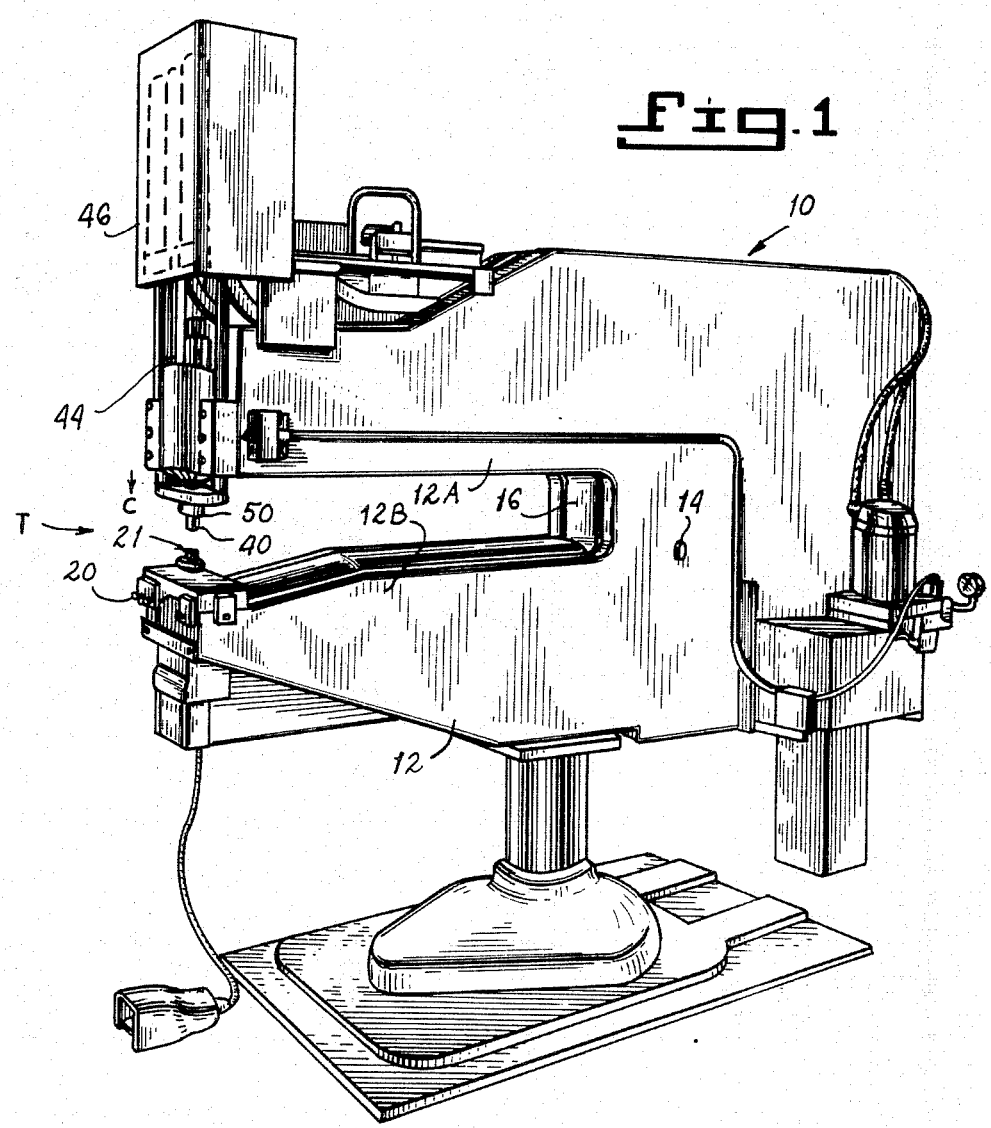
FIG. 1 is a general perspective view of the ultrasonic welding equipment of the present invention.

An ultrasonic spot welding machine capable of welding together structural metal sheets, referred to generally by reference numeral 10, is illustrated in side perspective view in FIG. 1. Ultrasonic spot welder 10 includes a generally C-shaped clamping frame 12 pivotably mounted about pivot 14 and supported on a stationary central welder frame 16. Clamping frame 12 includes elongated upper and lower sections 12A and 12B, respectively, which, in combination with the central welder frame 16, define a throat T into which the workpieces to be welded may be inserted for welding.

A welding head 20, including a welding tip 21, which forms the end of a vibratory reed 22, is provided and is secured to stationary welder frame 16. A slideably mounted anvil 40 is provided on the opposite side of the throat. Collar clamps 50 and 60 are provided about the anvil 40 and the welding tip 21, respectively.

Anvil 40, which is movable toward and away from welding tip 21 along anvil guide 44, is powered by at least one internally contained, hydraulic anvil cylinder 46. Movement of anvil 40 is independent of movement of collar clamp 50. When a workpiece W to be welded (not shown in FIG. 1) is inserted into the throat between the anvil 40 and the welding tip 21, the anvil 40 is lowered in a clamping direction C toward welding tip 21 until the workpieces are clamped together between collar clamps 50 and 60. This clamping action between clamps 50 and 60 not only serves to clamp the workpieces together but, additionally, causes a compressive force to be applied between them. Spot welding of the workpieces may therefore be accomplished in the manner hereinafter described.

Vibratory reed 22, at its end opposite the welding tip 21, is connected to a transducer (not shown) which is contained within welding frame 16. The transducer transmits lateral vibrations and induces flexural vibration of the reed 22 so that the welding tip 21 at the upper end of the reed 22 may introduce shear vibrations into workpieces. Transducer (not shown) consists of piezoelectric ceramic elements encased in a tension shell assembly and is operated at a nominal frequency of about 15 kHz.

Spot welder 10, which is a modification of the Sonobond Model M-8000 ultrasonic spot welder, includes a frequency converter which incorporates a wide-band RF power measuring circuit for sampling the output power to detect the forward power and the load power based on the principle of directional coupling in a transmission line. The signal is processed electronically by internal circuitry to provide true RMS values which are displayed as either the forward power or the load power. Forward power is the output of the frequency converter delivered to the transducer in the welding tip 21 while load power is the transducer drive power that is acoustically absorbed in the weld zone. The difference between the forward power and the load power represents the reflected power induced by the load impedance mismatch and is minimized during subsequent welding operations by impedance matching techniques.

Welding tip 21 and anvil 40 are both fabricated from a generally hard metal such as, for example, steel hardened to about $R_c$ 50. The radii of the welding tip 21 may be between about 2" and about 20" and the shape and dimension of anvil 40 generally conforms to that of the welding tip 21.

A high sensitivity, electronic "B" micrometer (Kaman Model KD-2300-1SV) was used to try to measure the effective forge motion by the welding tip 21 into a pair of aluminum workpieces which were being welded together. The micrometer revealed that the weld gap (i.e., the separation between the welding tip 21 and the anvil 40) expanded substantially at the start of the weld. If normal forge motion had occurred, the weld gap would have closed. It was recognized that the weld gap expanded because the thermal expansion of the workpieces in the weld zone exceeded the degree of forge motion.

Figure 2:
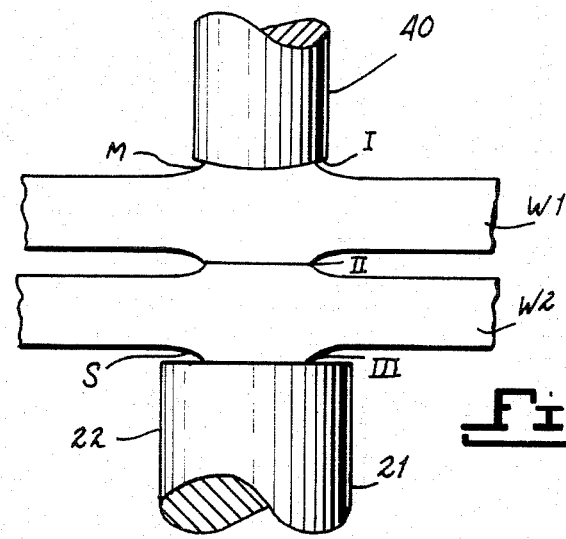
FIG. 2 is an enlarged view of the weld zone demonstrating the thermal mound effect.

If welding power is to be steadily delivered to the weld zone, all three interfaces involved must maintain substantially equal frictional slip resistance. This is illustrated in FIG. 2 which depicts the "weld zone" and illustrates the three interfaces involved: interface I between the anvil 40 and the upper workpiece W1; interface II between the upper workpiece W1 and the lower workpiece W2; and interface III between the lower workpiece W2 and the welding tip 21. As illustrated in FIG. 2, this triple interface creates a "thermal mound" M at the weld zone. The balance between the frictional slip resistance is achieved by a dynamic process of periodic slip and consequential increases in the interface or couple areas or couple coefficients of friction. It was observed that in those moments when motion occurs between the welding tip 21 and the lower workpiece W2, the welding tip 21 would, at times, slip off of the mound M, fail to pull back on the reverse cycle and cause a ratcheting down of a portion of the slope S about the mound M with the resultant "tip walking".

It is believed that the earliest frictional heat build-up is critical to the generation of a strong weld and, as a result, if gross motion occurs, the heat-up rate is retarded and only a weak weld results. Pre-heating of the workpieces W tends to eliminate this critical period. Pre-heating is undoubtedly associated with certain temperature sensitive changes in the mechanical properties of the workpieces such as shear strength, plasticity and flow resistance that are important to the detail mechanics of deformation and bond formation during a weld. Ultrasonic welding procedures are particularly sensitive to the frictional heat developed during welding, and pre-heating the workpieces has been shown to improve the likelihood that the necessary temperature conditions will be reached and a proper mature weld will result. Pre-heating also tends to effectively boost the operational capabilities of the ultrasonic welder 10 since the size and strength of the welds produced by the welder 10 are largely determined by the power generated in the ultrasonic transducer which is transmitted to the workpiece.

The uniqueness of this discovery is apparent in view of the fact that, hertofore, it has been generally believed that heat was not an important factor to be considered in ultrasonic welding. The present studies associated with the subject invention indicate that a very powerful thermal excitation occurs when proper welds are effected using ultrasonic welding techniques. This thermal build-up has been detected by measuring the thermal expansion that develops in the weld zone and the data indicates that temperatures reach or at least approach the melting point of the alloys to be welded together. Only the heat of fusion appears to act as a barrier to the melting of the surfaces of workpieces. This led to the discovery that a small thermal assist, i.e., pre-heating, is quite helpful in improving weld strength.

In order to demonstrate the effectiveness of pre-heating the workpieces prior to effecting an ultrasonic weld, two 0.063" sheets of 2024-T3 alclad were welded together using the prototype ultrasonic welding equipment described above and illustrated in FIG. 1. Upon subsequent testing, these welded sheets, under optimum conditions, averaged a breaking load of about 2800 lbs. The same type of sheets were then welded together using the same equipment but were first pre-heated to a temperature of about 150 F. Subsequent testing indicated a breaking load for the pre-heated sheets of in excess of 3300 lbs.

Figure 3:
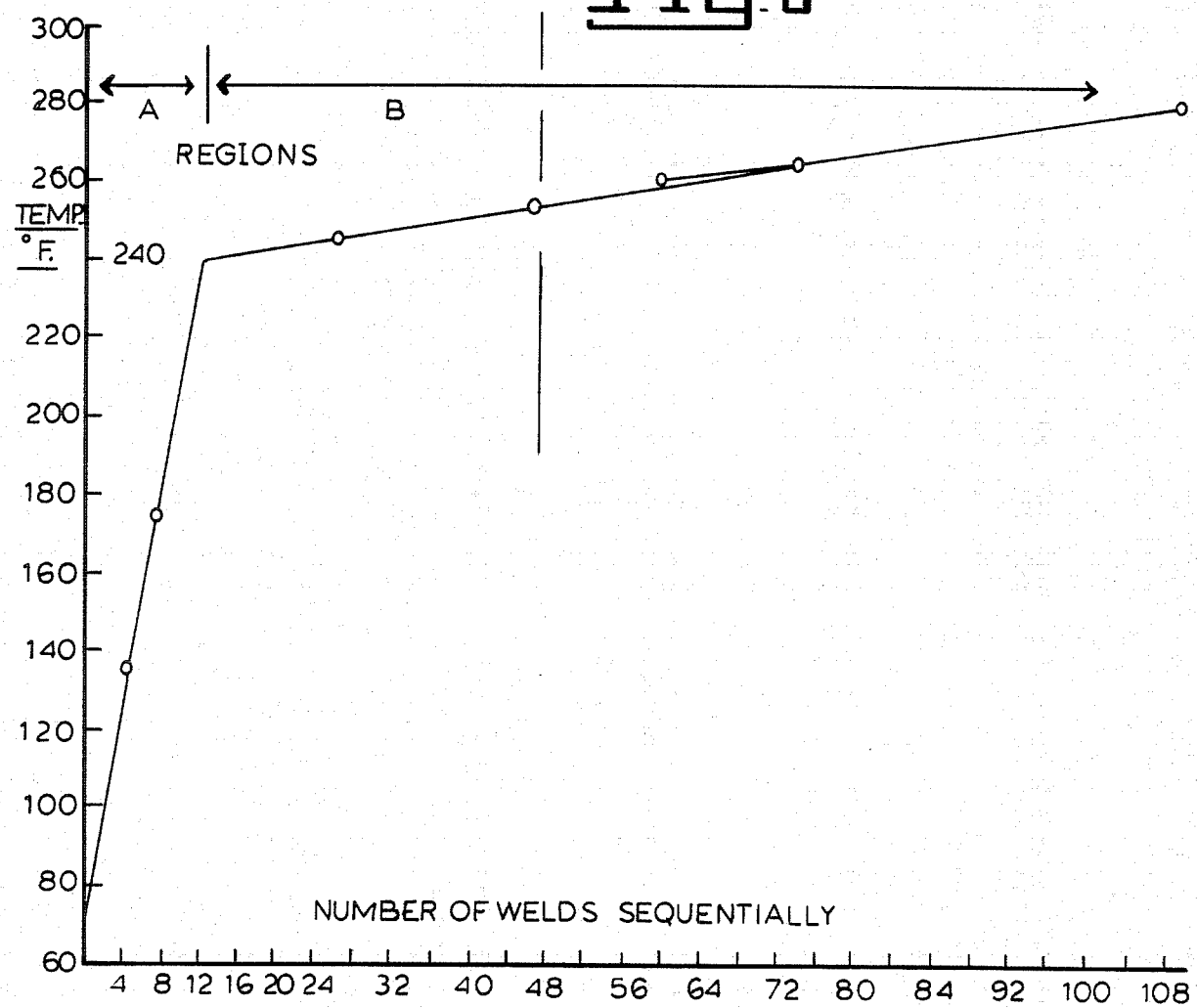
FIG. 3 is a graph plotting anvil temperature as a function of the number of welds sequentially made.

It has further been observed that the temperature of the welding tip 21 and of the anvil 40 play an important role in the characteristics of the individual welds effected. For example, it was noted that when welding large assemblies requiring a number of spot welds to be made in rapid succession, the temperature of the welding tip 21 and anvil 40 varied widely over the course of the welding cycle which caused an attendant change in the strength and characteristics of the resultant welds. This is shown graphically in FIG. 3 which plots anvil temperature actually measured during a succession of welds made at a rate of 6–7/minute. As shown in FIG. 3, it takes about 8 welds before anvil 40 reaches an optimal temperature (at least about 150° F.) and then it continues to rise, despite the fact that air is continually blown over the surface of the anvil 40 throughout the welding operation. At about 240° F., the temperature rise becomes more gradual. As the anvil temperature rises, there is experienced a corresponding increase in the size of the resultant weld due to the cooperative action of the welding tip 21 and the anvil 40.

The temperature of the anvil 40 and the welding tip 21 thereafter markedly increased as did the size of the weld effected by them. Thus, one viewing a panel containing a series of ultrasonic welds would see smaller welds at the initial welding stage followed by progressively larger welds as the cycle continued. To minimize this problem, attempts have, heretofore, made to cool and thereafter control the rising temperature of the welding tip 21 and anvil 40 using cooling means which, for example, pass compressed air directly over these parts. Attempts were also made to cut back on the time of the weld cycle and/or the amount of ultrasonic energy introduced into the workpieces W from the welding tip 21 during that cycle to avoid grossly different weld sizes between the beginning and end spots, particularly when welding more than a hundred spots in succession. As can readily be appreciated, constantly modifying the weld time and/or the amount of energy introduced therein increases the welding time and its attendant cost. Failure to so monitor and control the temperature of the anvil 40 and welding tip 21, however, produces grossly non-uniform and potentially structurally inferior welds due to overheating and possible burning of the workpieces. Moreover, the welding equipment may be damaged when forced to operate at continually high temperatures.

Figure 4:
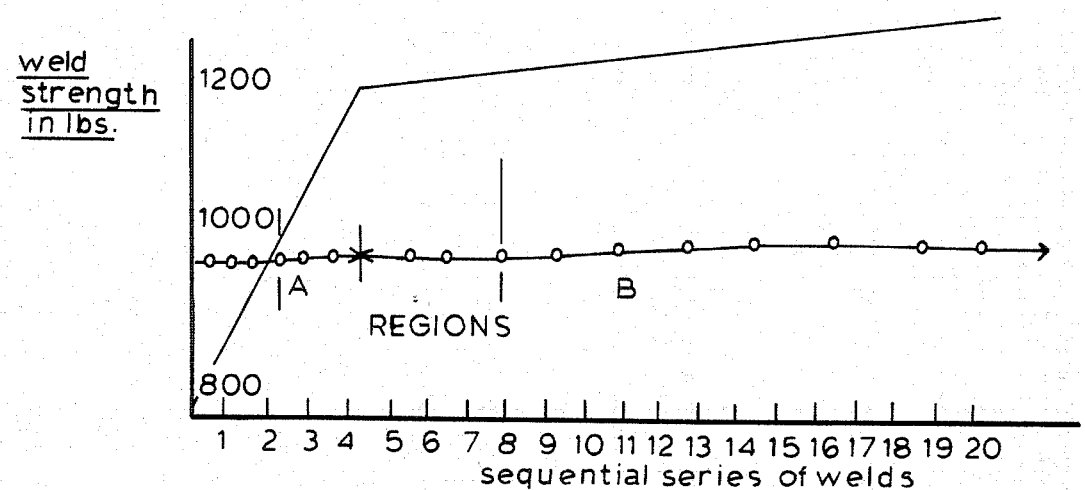
FIG. 4 is a graph plotting weld strength as a function of the number of welds sequentially made.

FIG. 4 is a graph which plots weld strength as a function of the number of welds made in the course of a sequential welding operation. As shown in FIG. 4, optimal weld strength is not obtained until at least about five welds are made.

Figure 5:
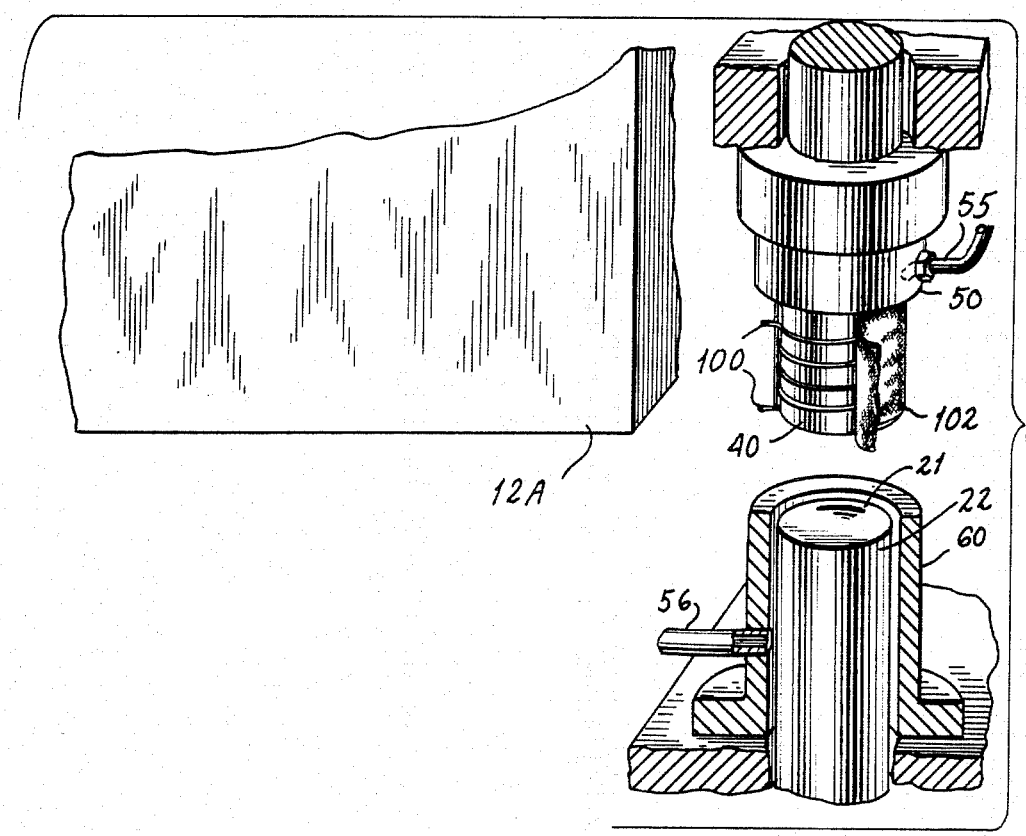
FIG. 5 is an enlarged view of the anvil portion of the ultrasonic welder shown in FIG. 1.
Figure 6:
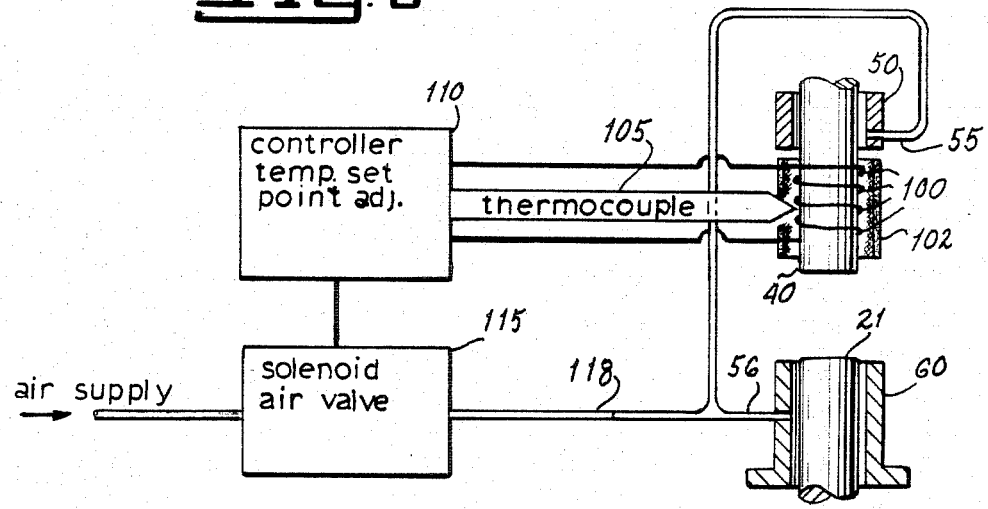
FIG. 6 graphically illustrates the manner in which the temperature of the anvil and welding tip are controlled.

The workpieces W may be pre-heated prior to welding by the use of heat guns or the like or by first placing the workpieces W on a heated surface such as, for example, a hot plate. A preferred method of pre-heating the workpieces W and of monitoring and controlling the temperature of the successive welding operations is by providing means on either or both the anvil 40 and the welding tip 21 which can generate a controlled amount of heat relative to those elements and also serve to pre-heat the workpieces W. As shown in FIGS. 5 and 6, resistance heat coils 100 are provided about anvil 40, isolated and covered by tape, preferably kapton tape 102. Heating coils 100 and a thermocouple 105 are connected to a variac transformer 110 which permit anvil 40 to be heated to a pre-determined temperature and maintained at or close to that temperature. Similarly, by heating anvil 40, heat is likewise generated in the workpieces W. Air jets 55 and 56, are both connected to a source of compressed cool gas (not shown), are provided in both clamps 50 and 60, respectively. A stream of compressed cold gas may be introduced through clamps 50 and 60 over the anvil 40 and welding tip 21 to cool them as they heat up during sequential welding operations. It will be appreciated that using such apparatus, only minimal power is required to raise the temperature of the anvil 40 to an operating temperature of at least about 150° F., a temperature level which is neither dangerous, damaging nor costly. When the workpieces W are inserted into the throat T of the welder 10 and clamped therein between clamps 50 and 60 with anvil 40 and welding tip 21 being brought into contact with the workpieces W, the heat from the anvil 40 quickly raises the temperature of the cooled workpieces W while correspondingly lowering the temperature of the anvil 40 and welding tip 21.

In order to continuously monitor of the temperature of the welding tip 21 and of the anvil 40, as shown in FIG. 6, resistance heating coils 100 and cold gas jets 55 and 56 are controlled by controller means 110 to insure that the temperature of the anvil 40 and of the welding tip 21 are maintained at a relatively constant temperature so that the resultant welds are of a generally uniform strength and size. A solenoid air valve 115 is provided between cold gas jets 55 and 56 and the source of compressed cold gas and is controlled by controller 110. Solenoid gas valve 115 is interconnected to cold gas jets 55 and 56 by conduits 118. To effect controlled heating, a first predetermined temperature is set on controller 110 and resistance heating coils 100 are turned "on" and remain on until that first pre-determined temperature is reached as measured by thermocouple 105. Upon reaching that first pre-determined temperature, internal electronic circuitry contained within controller 110 then switches off resistance heating coils 100 and actuates solenoid gas valve 115. As the frictional forces continue to cause the welding tip 21 and anvil 40 to continue to heat up, at a second predetermined temperature, controller 110 then causes cold gas jets 55 and 56 to open and begin introducing streams of compressed cold gas over the anvil 40 and the welding tip 21 in amounts sufficient to maintain these elements at the second predetermined temperature in order to insure that the resultant welds are of generally uniform character. This procedure is varied as the elements continue to heat up and cool down.

Having thus described the invention with particular reference to the preferred forms thereof, it will be obvious that various changes and modifications may be made therein without departing from the spirit and scope of the invention as defined by the appended claims.

Wherefore, we claim:

1. Ultrasonic vibratory welding apparatus of the type including a welding tip and a support anvil each including clamping means between which at least two workpieces may be welded together by the introduction of high frequency vibrations into and through said workpieces from said welding tip, said clamping means being adapted to move toward and away from each other in order to clamp said workpieces therebetween prior to the welding operation, said apparatus including means for pre-heating said workpieces to a predetermined temperature in exess of about 150° F. prior to welding, and thermal control means operatively associated with said pre-heating means for insuring the resulting welds from said ultrasonic vibratory welding apparatus are of generally uniform strength and size.

2. The apparatus of claim 1 wherein said thermal control means comprises a temperature sensor associated with said pre-heating means, a controller operatively connected to said temperature sensor and to said preheating means and means for cooling said anvil and/or said welding tip operatively connected to said controller, said controller being adapted to continuously monitor and control the temperature of said anvil and/or said welding tip to maintain the temperature of said anvil and said welding tip at a relatively constant temperature through the use of said temperature sensor, said pre-heating means and said cooling means.

3. The apparatus of claim 2 wherein said controller has setable means for turning on said pre-heating means until a first predetermined temperature is reached as measured by said temperature sensor, switch means for turning off said preheating means when said first predetermined temperature is reached and means for turning on said cooling means at a second predetermined temperature to maintain said anvil and/or said welding tip at said second predetermined temperature.

* * * * *